No. 784,046. PATENTED MAR. 7, 1905.
S. H. & P. E. HODGKIN.
WATER SOFTENING APPARATUS.
APPLICATION FILED FEB. 17, 1904.

Witnesses.
W. Henry Simms
E. Clough

Inventors.
S. H. Hodgkin
P. E. Hodgkin
per W Lloyd Wise
Attorney

No. 784,046.

Patented March 7, 1905.

UNITED STATES PATENT OFFICE.

STANLEY HOWARD HODGKIN AND PHILIP ELIOT HODGKIN, OF READING, ENGLAND.

WATER-SOFTENING APPARATUS.

SPECIFICATION forming part of Letters Patent No. 784,046, dated March 7, 1905.

Application filed February 17, 1904. Serial No. 193,988.

*To all whom it may concern:*

Be it known that we, STANLEY HOWARD HODGKIN and PHILIP ELIOT HODGKIN, subjects of the King of Great Britain and Ireland, residing at Reading, in the county of Berks, England, have invented Improvements in or Relating to Water-Softening Apparatus, of which the following is a specification.

This invention consists in various improvements in or relating to water-softening apparatus of the kind in which the hard water to be softened is discharged into a mixing vessel in definite quantities by means of an automatic water-flushing device, comprising a tank provided with a water-inlet pipe with cock, a fixed siphon, and a float that rises and falls with the level of the water admitted to and discharged from the tank and in which a chemical reagent, such as lime-water, is mixed in a given proportion with the hard water for softening the same. Water-softening apparatus of the kind referred to is described in the specification of former Letters Patent No. 731,902, dated June 23, 1903, granted to one of us—viz., the said Stanley H. Hodgkin.

The present invention has for object to enable the quantity of water discharged at each flushing operation to be maintained approximately constant notwithstanding variations in the rate at which the apparatus is worked. It also has for object to enable the proportions of hard water and chemical reagent to be made and maintained in a better and more exact manner than heretofore usual under all conditions of working.

The invention consists for these purposes in various novel features of construction and in combinations and arrangements of parts, all as hereinafter more particularly described, and pointed out in the claims.

Figure 1:
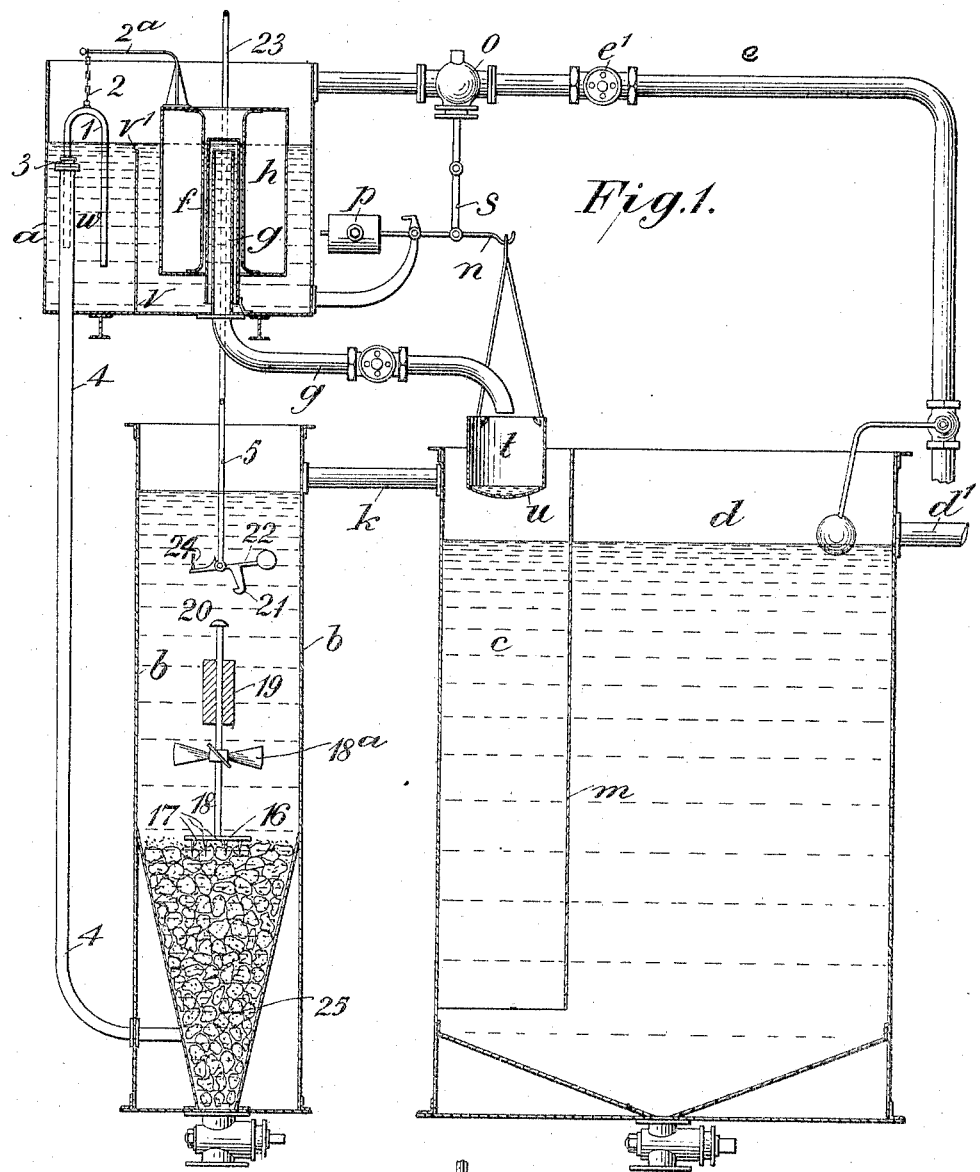
Figure 2:
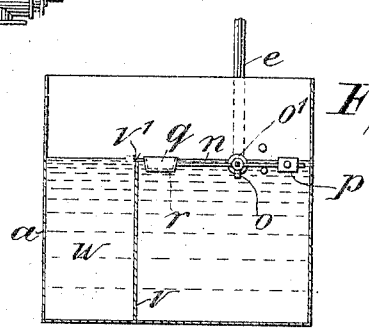

In the accompanying illustrative drawings, Figure 1 shows, partly in vertical section and partly in side elevation and more or less diagrammatically, one construction of water-softening apparatus embodying the present invention. Fig. 2 shows in vertical section a modified arrangement of means for controlling the supply of hard water to the water-flushing apparatus, the siphon and float being for the sake of clearness removed.

$a$ is a flushing-tank arranged above a vessel $b$, containing a chemical reagent, such as lime-water, $c$ being a mixing vessel, and $d$ a settling-tank having a discharge-pipe $d'$. The flushing-tank $a$ is provided with a pipe $e$, having a controlling-valve $e'$, and through which the hard water to be softened is supplied, with an automatic water-flushing device or siphon, comprising a stationary tube $f$, closed at the top and fitting over a discharge-pipe $g$, the lower end of which is arranged to terminate above the mixing vessel $c$, and with a float $h$. The upper part of the vessel $b$ is connected by a tube $k$ to the upper part of the mixing vessel $c$, which is formed by providing the tank $d$ with a depending partition $m$.

The above-mentioned parts are constructed and arranged substantially as shown in and described with reference to Fig. 1 of the said former specification; but they may be constructed and arranged in other ways to form water-softening apparatus of the kind mentioned and to which the present invention is to be applied.

In water-softening apparatus according to this invention provided with an automatic water-flushing device of the kind referred to there is used in connection with a cock or valve for admitting water to the flushing-tank means whereby such cock or valve will be automatically closed during the discharge of water from the tank through the siphon, so that the same amount of water will be discharged at each flushing operation whether the apparatus is being worked quickly or slowly, the rate of working being controlled, as usual, by a separate valve, such as the valve $e'$ on the water-supply pipe $e$. For this purpose there is used, according to the arrangement shown in Figs. 1 and 2, a valve $o$—for example, an equilibrium-valve—that is connected, as through a link $s$, to one arm of a lever $n$, the other arm of which is weighted at $p$ and acts normally to open and hold open the valve. Connected to the valve and lever is a small receptacle $t$, that is suspended above the mixing vessel c of the apparatus and below the outlet end of the water-discharge pipe g and has one or more discharge-openings u through its bottom. The arrangement is such that at each flushing operation water will enter the receptacle t, so as to weight the same and cause it to overcome the action of the weighted arm of the lever n and close the valve o until after the flushing action is completed and the said water or the greater portion of it has escaped from the receptacle t, whereupon the weighted arm of the lever will act to again open the valve and cause a further quantity of water to be admitted to the flushing-tank a. In this way, whether the main regulating-cock e′ be set to cause the automatic flushing device to act quickly or slowly, the same amount of hard water will be discharged from the tank a into the mixing vessel c at each flushing operation.

Fig. 2 shows another arrangement for automatically cutting off the supply of hard water to the flushing-tank during the discharge of water therefrom. In this case the admission of water to the flushing-tank a is controlled by a lever n, that is fixed at o′ to the rotary plug of a water-inlet cock o. One arm of this lever is weighted, as shown at p, and acts when unrestrained to open the plug of the cock o. The other arm of the lever carries an open-topped receptacle q, that is provided with a discharge-opening r of regulated size in its bottom and is so arranged, as shown, that it will be charged with water when the water in the tank a rises to such a level as to start the siphon. The arrangement is such that during the discharge of the water from the flushing-tank a through the siphon f g the water in the receptacle q will by reason of its weight move the plug into the closed position and hold it closed until the water admitted to such receptacle has escaped through the opening r, which is made of such a size that the water, or the greater portion of it, will have escaped from the receptacle at about the same time as the discharge of the water from the tank a by the siphon is completed, whereupon the weighted arm of the lever n will overcome the weight of the empty or nearly empty receptacle q and open the cock o, so as to admit a further supply of hard water to the tank.

According to one construction definite quantities of lime-water are caused to pass to the mixing vessel of the water-softening apparatus and become mixed with the hard water admitted thereto by causing a definite quantity of hard water to pass from the flushing-tank to the lower end of the lime-water vessel at each flushing operation, and so displace a corresponding quantity of lime-water from the upper part of the vessel and cause it to overflow into the mixing vessel. In the arrangement shown for this purpose in Fig. 1 the flushing-tank a has a vertical partition v, that serves to form in conjunction with the wall of the tank a supplementary compartment w, the top edge v′ of the partition v being arranged at such a height that hard water admitted to the flushing-tank will upon rising sufficiently overflow such edge and fill the supplementary compartment w before attaining such a level as to start the siphon and upon afterward falling below such edge will leave the said compartment charged to a given level that will be constant for each charging operation. Suspended in the compartment w is a movable siphon 1, the upper end of which is carried by a chain 2 and a projecting arm 2$^a$ from the float h in the flushing-tank a and the longer leg of which in the example works vertically through a suitable stuffing-box or joint 3 into a pipe 4, that extends through the bottom of the compartment w and discharges into the lower end of the lime-water vessel b. As will be seen, the arrangement is such that during the charging of the flushing-tank a and the rising of the float h therein the movable siphon 1 will be gradually raised, so as to prevent it starting; but upon the float falling during the discharge of the flushing-tank it will be lowered to a definite depth in the water in the compartment w, so as to start in action and deliver an exact quantity of water to the lower end of the lime-water vessel b, whereby a corresponding quantity of lime-water will be displaced from the upper part of such vessel and caused to flow through the pipe k into the mixing vessel c, where it will become mixed with the hard water escaping from the pipe g.

For stirring or agitating the lime in the lower part of the lime-water vessel in a more effective manner than heretofore usual, so as to facilitate the ready formation of a saturated solution of lime-water, the said vessel is provided according to this invention with a vertically-movable stirring or agitating device, and there is provided, in connection with the vertically-movable float of automatic water-flushing apparatus of the kind hereinbefore referred to located above the said vessel, means whereby the stirring or agitating device can be engaged and raised by the float and afterward released, so that it can fall suddenly into the lime and effectually break up and agitate the same after each operation of the flushing apparatus. In the arrangement shown for this purpose in Fig. 1 the agitating device comprises a plate 16, provided with depending teeth 17 and carried by a rod 18, that works through a fixed guide 19 in the lime-water vessel b, and is provided at its upper end with a head 20, that serves as a hook. 21 is a hook for engaging the head 20. It is carried by the weighted arm of a lever 22, pivoted to the rod 5, which is connected, through a rectangular frame 23, to the top of the float h. 24 is a bar fixed across the vessel b, so as to be in the path of the unweighted arm of the lever 22. The arrangement is such that when the rod 5 descends the hook 21 will be caused by the action of the weighted arm of the lever 22 to engage the under side of the head 20 on the rod 18, so that upon the rod 5 rising the rod 18, with stirring device 16 17, will be lifted until by the action of the cross-bar 24 on the unweighted arm of the lever 22 the hook 21 is disengaged from the head 20, whereupon the stirring device will fall suddenly into the lime 25 in the lower part of the vessel $b$ and break up and agitate the same for the purpose hereinbefore mentioned. The rod 18 may be adapted, as by providing it with vanes $18^a$, to be partly rotated by the water when being raised and lowered.

As will be obvious, the details of construction adopted in carrying out the invention can be variously modified. Also in lieu of the movable siphon 1 other water-discharging means may be provided for effecting the discharge of water from the compartment $w$.

What we claim is—

1. Water-softening apparatus comprising a mixing vessel, an automatic intermittent water-flushing apparatus arranged to discharge into said mixing vessel, a liquid-reagent tank arranged to discharge into said mixing vessel, means for discharging liquid reagent at each operation of the flushing apparatus, a pipe for admitting water to said flushing apparatus, a valve for controlling the flow of water from said pipe, and means adapted to automatically close said valve during the discharge of water from said flushing apparatus.

2. Water-softening apparatus comprising a mixing vessel, an automatic intermittent water-flushing apparatus arranged to discharge into said mixing vessel, a liquid-reagent tank arranged to discharge into said mixing vessel, means for discharging liquid reagent at each operation of the flushing apparatus, a pipe for admitting water to said flushing apparatus and provided with a main regulating-valve, a second valve for controlling the flow of water from said pipe, means adapted by the weight of water received from said flushing apparatus to close the second valve during the discharge of water from the flushing apparatus and, by loss of water, to automatically reopen such valve after the discharge of water from the flushing apparatus.

3. Water-softening apparatus comprising a mixing vessel, an automatic intermittent water-flushing apparatus arranged to discharge into said mixing vessel, a liquid-reagent tank arranged to discharge into said mixing vessel, means for discharging liquid reagent at each operation of the flushing apparatus, a pipe for admitting water to said flushing apparatus, a valve for controlling the flow of water from said pipe, a receptacle connected to said valve and provided with a small discharge-outlet, said receptacle being arranged to be charged with water from said flushing apparatus and to close the valve during the discharge of water from the apparatus, and means for automatically reopening said valve after the escape of water from said receptacle.

4. Water-softening apparatus comprising a mixing vessel, an automatic intermittent water-flushing apparatus arranged to discharge into said mixing vessel, a liquid-reagent tank arranged to discharge into said mixing vessel, means for discharging liquid reagent at each operation of the flushing apparatus, a pipe for admitting water to said flushing apparatus and provided with a main regulating-valve, a second valve for controlling the flow of water from said pipe, a lever connected to the second valve, a receptacle connected to the lever, said receptacle having a water-discharge outlet and arranged to be charged with water from the flushing apparatus and thereby to close the second valve during the discharge of water from the flushing apparatus, and means for automatically returning the receptacle and lever to their original positions and reopening the second valve after escape of water from the receptacle.

5. Water-softening apparatus comprising a mixing vessel, an automatic intermittent water-flushing apparatus arranged to discharge into said mixing vessel, a liquid-reagent tank arranged to discharge into said mixing vessel, means for discharging liquid reagent at each operation of the flushing apparatus, a pipe for admitting water to said flushing apparatus and provided with a main regulating-valve, a second valve for controlling the flow of water from said pipe, a lever connected to the second valve, a receptacle having a water-discharge outlet therefrom and carried by said lever, said receptacle being arranged below said flushing apparatus so as to be charged with water therefrom, and to close the second valve during the discharge of water from the flushing apparatus, and means for afterward automatically reopening the second valve and raising the receptacle to its original position.

6. Water-softening apparatus comprising a mixing vessel, an automatic intermittent water-flushing apparatus arranged to discharge into said mixing vessel, a liquid-reagent tank arranged to discharge into said mixing vessel, means for discharging liquid reagent at each operation of the flushing apparatus, a pipe for admitting water to said flushing apparatus and provided with a main regulating-valve, a second valve for controlling the flow of water from said pipe, a lever connected to the second valve, a weight connected to one end of said lever and acting normally to hold the second valve open, and a receptacle with perforated bottom connected to the other end of said lever and arranged to be charged with water from said flushing apparatus, substantially as described.

7. Water-softening apparatus comprising an automatic water-flushing apparatus provided with a float, a reagent vessel, a mixing vessel into which water and reagent are intermittently discharged from said flushing apparatus and reagent vessel respectively, a chamber connected to the reagent vessel and adapted to be charged to a predetermined height with water from the flushing apparatus, and means controlled from said float and adapted to cause a predetermined quantity of water to pass from said chamber to said reagent vessel at each operation of the flushing apparatus for the purpose set forth.

8. Water-softening apparatus comprising an automatic water-flushing apparatus provided with a float, a reagent vessel, a mixing vessel into which water and reagent are intermittently discharged from said flushing apparatus and reagent vessel respectively, a chamber connected to the reagent vessel and adapted to be charged to a predetermined height with water from the flushing apparatus only after the same has been charged to a given height with water and to be left charged with a definite quantity of water after the level of that in the flushing apparatus has fallen below that in the chamber, and means controlled from said float and adapted to cause a predetermined quantity of water to pass from said chamber to said reagent vessel at each operation of the flushing apparatus for the purpose set forth.

9. Water-softening apparatus comprising an automatic water-flushing apparatus provided with a float, a reagent vessel, a mixing vessel into which water and reagent are intermittently discharged from said flushing apparatus and reagent vessel respectively, a chamber connected to the reagent vessel and adapted to be charged to a predetermined height with water from the flushing apparatus only after the same has been charged to a given height with water and to be left charged with a definite quantity of water after the level of that in the flushing apparatus has fallen below that in the chamber, and water-discharging means located in said chamber and controlled from said float and whereby a determined quantity of water will be caused to pass from said chamber to said reagent vessel at each operation of the flushing apparatus.

10. Water-softening apparatus comprising an automatic water-flushing tank provided with a float, a lime-water vessel, a mixing vessel into which hard water is discharged from the flushing-tank and lime-water from the upper portion of said lime-water vessel, said flushing-tank being constructed with main and supplementary compartments of which the latter is arranged to be filled with a definite quantity of water from the former when the level of the water therein rises sufficiently high and afterward falls, and a movable water-discharging device that is arranged in the supplementary compartment, is connected to the float in the main compartment, and is adapted to cause a definite quantity of water to be discharged from the supplementary compartment into the lower portion of the lime-water vessel, at each operation of the flushing apparatus.

11. In water-softening apparatus of the kind herein referred to, the combination with a lime-water vessel and a mixing vessel, of a flushing-tank arranged at a higher level than the said vessels and provided internally with a stationary siphon, a movable float, and a partition arranged to divide the interior of the tank into a main compartment and a supplementary compartment, the latter of which is arranged to be charged with water from the main compartment over the top edge of said partition, a movable siphon suspended in the supplementary compartment from said float, and a pipe connecting said movable siphon to the lower portion of the lime-water vessel, the movable siphon being arranged to come into action only after the level of the water in the main compartment has fallen below the top edge of the partition.

12. Water-softening apparatus comprising a mixing vessel, an automatic intermittent water-flushing apparatus arranged to discharge water into said mixing vessel at each flushing operation, a liquid-reagent tank arranged to discharge into said mixing vessel, means for supplying water to said flushing apparatus, means adapted to cause definite quantities of liquid reagent to flow into said mixing vessel at each operation of the flushing apparatus, and means adapted to automatically cut off the supply of water to the flushing apparatus during the discharge of water therefrom.

13. Water-softening apparatus comprising a mixing vessel, an automatic intermittent water-flushing apparatus arranged to discharge water into said mixing vessel at each flushing operation, a liquid-reagent tank arranged to discharge into said mixing vessel, means for supplying water to said flushing apparatus, means adapted to cause a definite quantity of water to flow from the flushing apparatus at each operation thereof, into the liquid-reagent tank, and means adapted to automatically cut off the supply of water to the flushing apparatus during the discharge of water therefrom into the mixing vessel.

14. Water-softening apparatus comprising an automatic water-flushing tank provided with a float, a lime-water vessel, a mixing vessel into which hard water is discharged from the flushing-tank and lime-water from the upper portion of said lime-water vessel, said flushing-tank being constructed with main and supplementary compartments of which the latter is arranged to be filled with a definite quantity of water from the former when the level of the water therein rises sufficiently high and afterward falls, a water-pipe with valve for controlling the supply of water to the main compartment of the flushing-tank, means adapted to automatically close said valve during the discharge of water from the flushing-tank, and a movable siphon that is supported in the supplementary compartment, is connected to the float in the main compartment, and is adapted to discharge a definite quantity of water from the supplementary compartment into the lower portion of the lime-water vessel at each operation of the flushing apparatus.

Signed at Reading, in the county of Berks, England, this 1st day of February, 1904.

STANLEY HOWARD HODGKIN.
  PHILIP ELIOT HODGKIN.

Witnesses:
 JOHN W. MARTIN,
 FREDK. N. MARTIN.